(12) United States Patent
Miya et al.

(10) Patent No.: US 6,343,206 B1
(45) Date of Patent: *Jan. 29, 2002

(54) TRANSMISSION POWER CONTROL APPARATUS AND RADIO COMMUNICATION APPARATUS

(75) Inventors: Kazuyuki Miya, Kawasaki; Masaki Hayashi; Takashi Kitade, both of Yokosuka, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,016

(22) Filed: Feb. 4, 1999

(30) Foreign Application Priority Data

Feb. 10, 1998 (JP) ............................................. 10-044429

(51) Int. Cl.[7] .......................... H04B 7/005; H04Q 7/20
(52) U.S. Cl. ......................................... 455/69; 455/522
(58) Field of Search .................... 455/69, 522; 370/335, 370/342

(56) References Cited

U.S. PATENT DOCUMENTS

| | | | |
|---|---|---|---|
| 5,590,409 A | * 12/1996 | Sawahashi | .................... 455/69 |
| 5,604,730 A | 2/1997 | Tiedemann, Jr. | |
| 5,623,486 A | 4/1997 | Dohi et al. | |
| 5,689,815 A | 11/1997 | Yamazaki et al. | |
| 5,835,846 A | 11/1998 | Furukawa et al. | |
| 5,852,782 A | * 12/1998 | Komatsu | .................... 455/522 |
| 5,887,245 A | * 3/1999 | Lindroth | ....................... 455/69 |
| 5,924,043 A | * 7/1999 | Takano et al. | ................. 455/69 |
| 5,943,610 A | * 8/1999 | Endo | ............................ 455/69 |
| 6,034,952 A | * 3/2000 | Dohi et al. | .................. 370/335 |
| 6,055,415 A | * 4/2000 | Suzuki | ........................ 455/69 |

FOREIGN PATENT DOCUMENTS

| | | |
|---|---|---|
| DE | 19725438 | 12/1997 |
| EP | 665657 | 8/1995 |
| EP | 683570 | 11/1995 |
| EP | 717508 | 6/1996 |

OTHER PUBLICATIONS

"Fast Cell Search Algorithm Using Long Code Masking In DS–CDMA Asynchronous Cellular System", Technical Report of the IEICE, pp. 57–63, along with an English Language abstract.

* cited by examiner

Primary Examiner—Nguyen T. Vo
(74) Attorney, Agent, or Firm—Greenblum & Bernstein, P.L.C.

(57) ABSTRACT

The transmission power control apparatus includes a section for calculating the reception power of a desired radio wave from the received signal, section for storing the reception power above, section for storing past transmission power, section for demodulating the control signal periodically included in the received signal and section for determining the transmission power set value above, and determines a transmission power set value using the past transmission power, reception power of the desired radio wave and the control signal.

19 Claims, 15 Drawing Sheets

TRANSMISSION POWER CONTROL APPARATUS AND RADIO COMMUNICATION APPARATUS

BACKGROUND OF THE INVENTION

1. Field of the Invention

The present invention relates to transmission power control apparatuses and radio communication apparatuses used for digital cellular mobile communications, etc.

2. Description of the Related Art

A multiple access system means a line access system when a plurality of stations carry out communications simultaneously using a same band. For example, CDMA (Code Division Multiple Access) refers to code division multiple access, a technology realizing multiple access through spread spectrum communications transmitting an information signal with its spectrum spread over a sufficiently wide band relative to the original information bandwidth.

This technology is sometimes called "spread spectrum multiple access (SSMA)." The mainstream of this CDMA system is a direct spreading system in which a spreading system code is carried on an information signal as is when it is spread.

Since a plurality of communications share a same frequency in the direct spreading CDMA system, the system has a problem (near-far problem) of equalizing the intensity of an interference wave (communication wave of a different station) with that of a desired radio wave at a receiving end and how to overcome this problem is a prerequisite to implement the CDMA system. The perspective problem becomes critical when a base station receives radio waves from many stations at different locations simultaneously, and thus it is essential for a mobile station to control transmission power according to the state of each transmission path.

As a transmission power control method, two methods are available; open-loop control performed based on the reception level of a mobile station and closed-loop control performed by a base station by feeding back information of its reception level to a mobile station as a control signal.

Mobile station transmission power Ti at transmission timing i (i=0 1, . . . ) in open-loop control is expressed as shown in expression (1) using transmission power PBS of the base station and reception level target value Rtg of the base station. In expression (1), Ri stands for the reception power of a desired radio wave.

$$Ti = Rtg + (P_{BS} - Ri) \quad (1)$$

A CDMA/TDD system which applies a TDD (Time Division Duplex) system that carries out communications by time-dividing a same radio frequency between transmission and reception to the CDMA system, is known to have the ability to implement dynamic and high-precision transmission power control relatively easily by means of open-loop control taking advantage of the high correlativity in characteristics of the propagation path between transmission and reception.

FIG. 1 is a block diagram showing the configuration of transmission power control apparatus 1 that performs open-loop control in conventional CDMA transmission. In this apparatus, reception power calculation circuit 11 calculates the reception power of a desired radio wave using the correlator output. Here, the reception system is provided with an AGC circuit, etc. and if the apparatus has a configuration in which the level of a received signal is adjusted before correlation operations, reception power calculation circuit 11 calculates correct reception power using not only the correlator output but also the adjustment value (AGC gain) above.

The correlator output is input to demodulation circuit 12, and a control signal included in the received signal for controlling transmission power is demodulated and sent to transmission power calculation circuit 13. Transmission power calculation circuit 13 calculates a transmission power set value (Ti of expression (1)) based on the reception power (Ri of expression (1)), transmission power (PBS of expression (1)) and desired reception level (Rtg of expression (1)) of the communication counterpart and outputs it.

On the other hand, transmission power Ti in closed-loop transmission power control is expressed as shown in expression (2) using transmitted power Ti-1 in the immediately preceding control cycle.

$$T_i = T_{i-1} + U_i \quad (2)$$

More precisely, Ui in expression (2) means a variation of power controlled by the control signal and generally indicates a preset value of power variation (hereinafter referred to as "step") by which the transmission power is increased/decreased in response to the control signal which is an instruction for increasing/decreasing the transmission power. In further explanations, Ui will mean the value described above.

FIG. 2 shows transmission/reception intervals of a mobile station in a communication system which uses the TDD system as the communication system, its cycle (TDD cycle), MS reception power R on the downlink at that time, control signal (TPC for uplink) U and an example of the timing of MS transmission power T.

In FIG. 2, transmission power Ti of MS in TDD cycle i is calculated from expression (1) based on average reception power Ri in the immediately preceding reception interval, known base station transmission power PBS and desired reception level Rtg of the base station in open-loop control, while in closed-loop control it is calculated from expression (2) using received control signal Ui. Thus, in the CDMA/TDD transmission system using the transmission power control apparatus for mobile stations, power received from the base station is controlled so that it may be always fixed at a certain level for all mobile stations.

However, as is clear from expression (1), in open-loop control, the conventional transmission power control apparatus above has a problem that transmission power PBS of the base station and desired reception level Rtg of the base station must be known in order to calculate transmission power Ti from reception power Ri. It also has another problem that it is difficult to perform transmission power control on the downlink.

On the other hand, in closed-loop transmission power control, it has a problem that the transmission speed of the control signal transmitted from the base station to mobile stations increases in order to implement high precision transmission power control according to fading, which will reduce the frequency utilization efficiency.

SUMMARY OF THE INVENTION

The present invention has been implemented taking into account the points described above and it is an objective of the present invention to provide a transmission power control apparatus and radio communication apparatus in the CDMA radio system that allow dynamic transmission power control which is a feature of open-loop control without requiring information of the communication counterpart such as Rtg and PBS above, and also realize transmission power control at an equivalent control speed on the reverse line.

The present inventor et al. came to implement the present invention after taking notice of the fact that in the transmission power control apparatus, information on the reception power need not be transmitted from the communication counterpart on the uplink and downlink, discovering that the transmission power can be controlled accurately by storing the reception power of the preceding communication and calculating the transmission power from a difference from the actual reception power of communication using said information, without using the received transmission power PBS of the base station and desired reception level Rtg of the base station.

In other words, the main point of the present invention is to provide a transmission power control apparatus installed on the transmitting side comprising means for calculating desired radio wave reception power from a received signal, means for storing the reception power, means for storing past transmission power, means for demodulating a control signal included in the received signal and means for determining a transmission power set value, and determine the transmission power set value above using the past transmission power, desired radio wave reception power and control signal.

Furthermore, in addition to the above means, said transmission power control apparatus also comprises means for storing a control signal transmitted for transmission power control carried out on the reverse line and can determine the transmission power set value using this control signal, too.

Furthermore, the transmission power control apparatus installed on the receiving side comprises means for calculating the reception power of a desired radio wave or SIR from the received signal, means for comparing with a target value and means for outputting a control signal, measures average reception power of the desired radio wave or SIR from the received signal transmitted by transmission power control, detects a difference from the target value and transmits a control signal based on the result.

Here, in view of performing open-loop transmission power control on the uplink as well as closed-loop transmission power control on the downlink (changing base station transmission power PBS), the control speed (cycle and amount of control) of the downlink must be sufficiently slow (long control cycle or small amount of control) relative to the control speed of control signal Ui that corrects the uplink.

This is because when the difference in the base station reception power caused by a PBS variation is corrected by Ui, performing high-speed control of PBS causes a problem of increasing the transmission speed of control signal Ui that is transferred from the base station to the mobile station, which reduces the frequency utilization efficiency.

By the way, transmission power control of the downlink is often performed for the purpose of keeping constant the communication quality of each mobile station in the system rather than solving perspective problems as in the case of the uplink and closed-loop control is generally performed by feeding back a control signal from the mobile station to the base station based on the reception level or reception SIR information at the mobile station. Therefore, when open-loop transmission power control is performed on the uplink, it is difficult to introduce transmission power control on the downlink with a control speed equivalent to that of the uplink.

Furthermore, the open-loop transmission power control apparatus has a problem that the base station reception power varies from one mobile station to another caused by differences in control of mobile stations. Possible causes are reception power measurements by the AGC circuit and differences produced in the actual transmission power, etc. due to a temperature characteristic with respect to the set values by the PA circuit. Moreover, it is impossible to adaptively control the transmission power of mobile stations to a minimum necessary value according to traffic variations as in the case of closed-loop control.

Therefore, the present inventor et al. invented a corrective method using control signal Ui which is received periodically as shown in expression (3) when closed-loop control is combined. The content of this is also included herein.

$$Ti = Rtg + (P_{BS} - Ri) + \sum_{m=0}^{i} Um \qquad (3)$$

This allows the transmission power of the mobile station to be controlled adaptively according to traffic variations as in the case of closed-loop control.

That is, the present inventor et al. solved not only the problems described above but also problems that possibly occur when performing open-loop transmission power control on the uplink and closed-loop transmission power control on the downlink.

DETAILED DESCRIPTION OF THE PREFERRED EMBODIMENTS

With reference now to the attached drawings, the embodiments of the present invention are explained in detail below.

Embodiment 1

Figure 3:
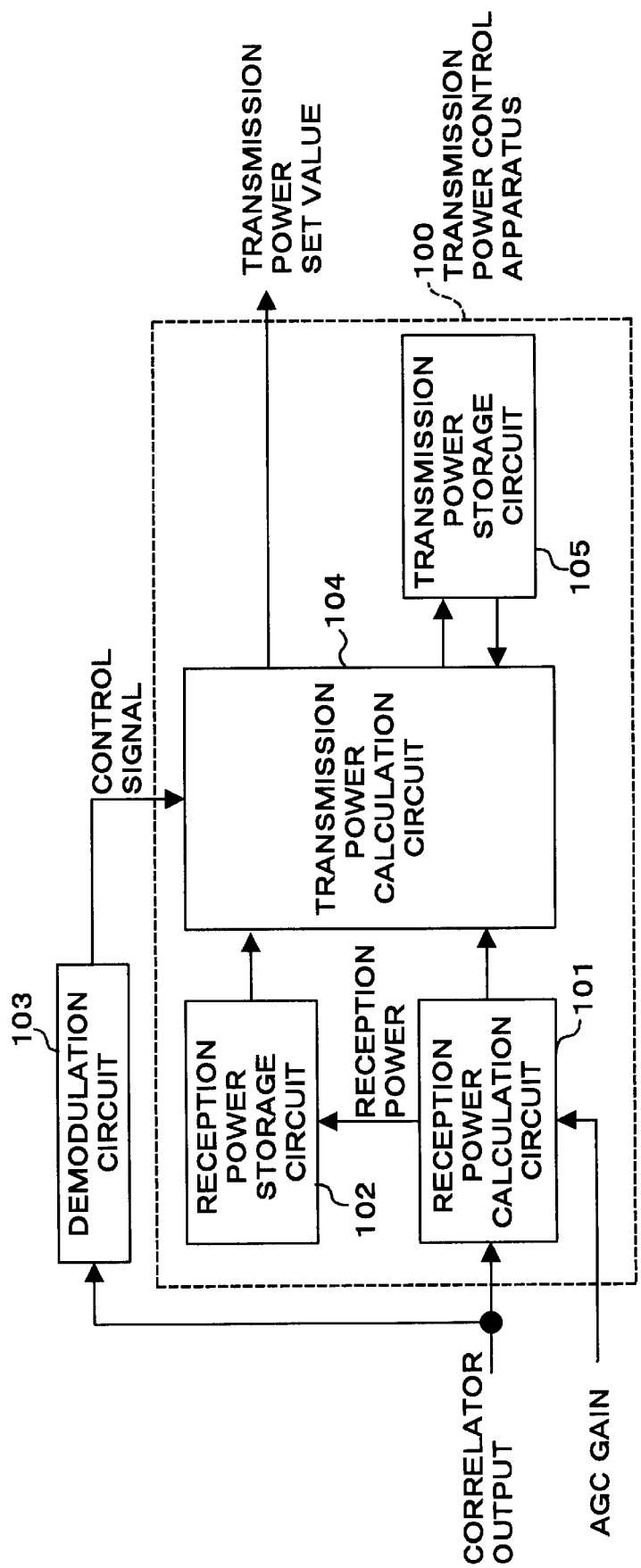
FIG. 3 is a block diagram showing the configuration of a transmission power control apparatus according to Embodiment 1 of the present invention.

FIG. 3 is a block diagram showing the configuration of a transmission power control apparatus according to Embodiment 1 of the present invention. Transmission power control apparatus 100 comprises reception power calculation circuit 101 that calculates the reception power of a desired radio wave, reception power storage circuit 102 that stores the calculated reception power, demodulation circuit 103 that demodulates a correlator output, transmission power calculation circuit 104 that calculates the transmission power based on the stored reception power and transmitted control signal, and transmission power storage circuit 105 that stores the calculated transmission power.

In transmission power control apparatus 100 configured as shown above, the reception power of a desired radio wave is calculated using the correlator output in reception power calculation circuit 101 and the calculated reception power is stored in reception power storage circuit 102. The reception system is provided with an AGC circuit, etc., and if the apparatus has a configuration in which the level of a received signal is adjusted before correlation operations, reception power calculation circuit 101 calculates correct reception power using not only the correlator output but also the adjusted value (AGC gain) above.

Furthermore, the correlator output is input to demodulation circuit 103 and the control signal is demodulated there. In transmission power calculation circuit 104, the transmission power is calculated using past transmission power stored in transmission power storage circuit 105, the reception power of the desired radio wave stored in reception power storage circuit 102 and the control signal, and a transmission power set value is output.

For example, transmission power Ti is calculated from expression (4). Expression (4) can be obtained from difference (3)–(3)' between transmission power Ti in cycle i of expression (3) and transmission power Ti-1 (expression (3)') in cycle i-1. In expression (4), (Ri-1-Ri) indicates a reception power variation during a control cycle period and means a variation (mainly fading variation) in the state of the propagation path.

$$T_i = Rtg + (P_{BS} - R_i) + \sum_{m=0}^{i} Um \quad (3)$$

$$T_{i-1} = Rtg + (P_{BS} - R_{i-1}) + \sum_{m=0}^{i-1} Um \quad (3)'$$

From (3)–(3)'

$$T_i = T_{i-1} + (R_{i-1} - R_i) + U_i \quad (4)$$

Figure 1:
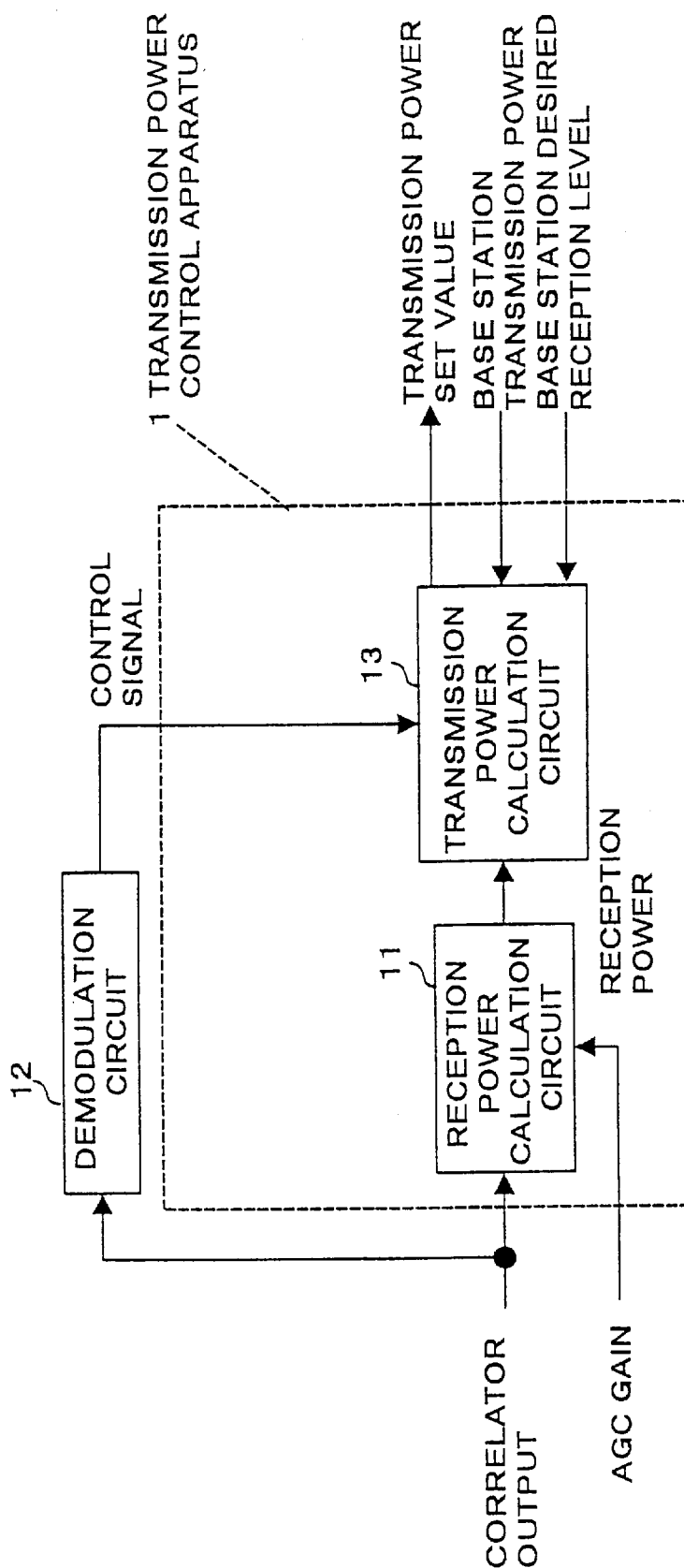
FIG. 1 is a block diagram showing the configuration of a conventional transmission power control apparatus.
Figure 2:
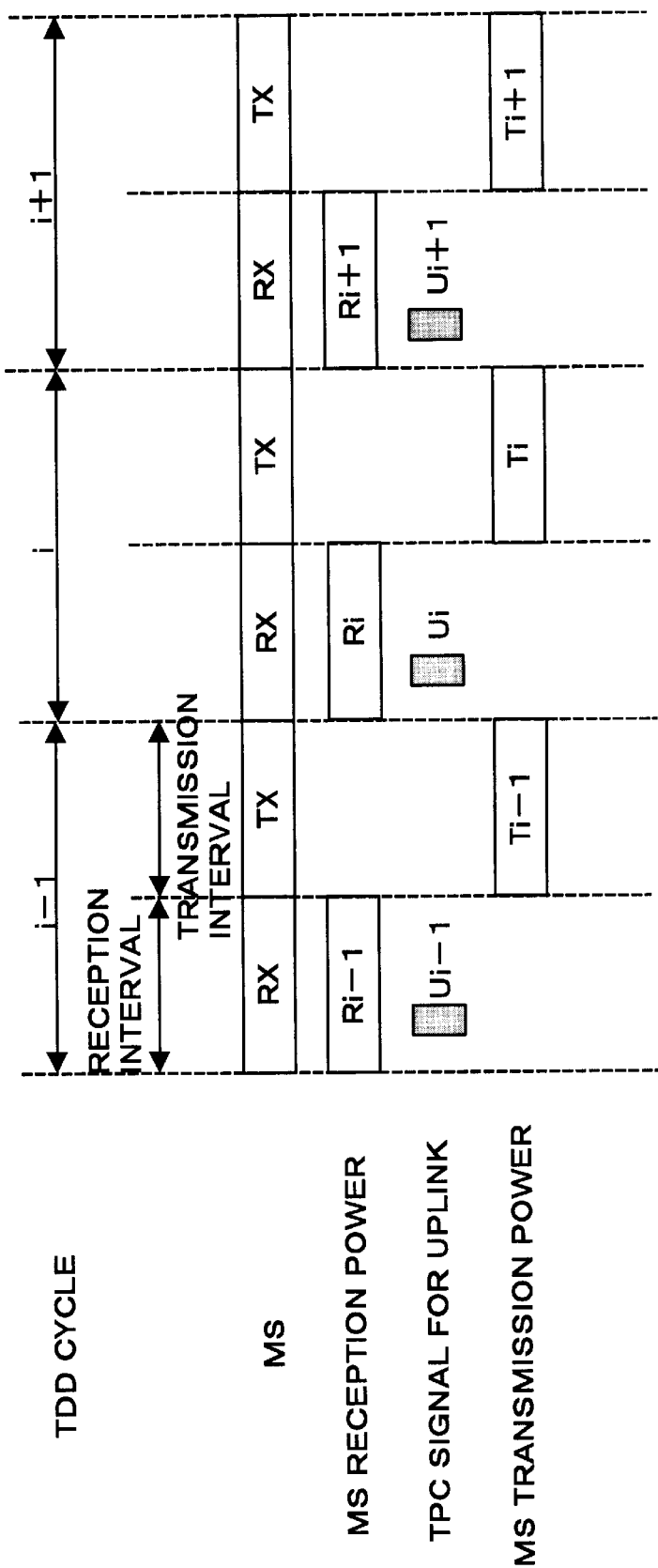
FIG. 2 is a timing chart showing an example of reception, MS transmission power, etc. of a conventional control signal.

The transmission/reception intervals of a mobile station (MS) in a communication system which carries out transmission using a TDD system as the communication system and its cycle (TDD cycle), MS reception power R on the downlink at that time, control signal U included in the received signal(TPC for the uplink) and one example of the timing of MS transmission power T are the same as those of the conventional example shown in FIG. 2. In FIG. 2, transmission power Ti of the MS in TDD cycle i is obtained from expression (4) based on transmission power Ti-1 in immediately preceding TDD cycle i-1, average reception power Ri-1, immediately preceding average reception power Ri and control signal Ui received immediately before.

As shown above, the present embodiment allows dynamic control of transmission power which is a feature of open-loop control without requiring information of the communication counterpart. The present embodiment can also eliminate the necessity of storage of the cumulative value of control signals during corrections through closed-loop control.

Embodiment 2

Figure 4:
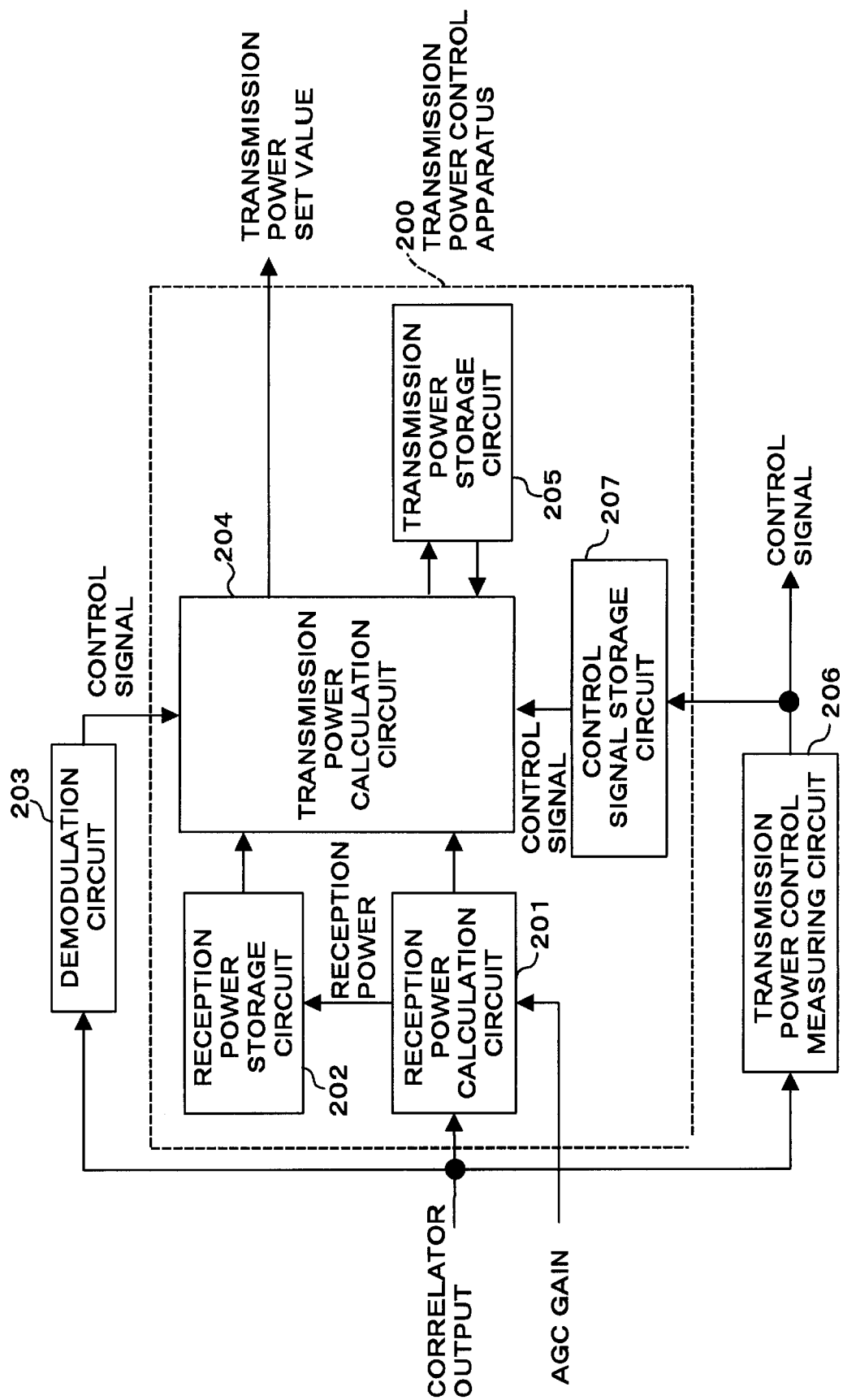
FIG. 4 is a block diagram showing the configuration of a radio communication apparatus according to Embodiment 2 of the present invention.

FIG. 4 is a block diagram showing the configuration of a radio communication apparatus equipped with a transmission power control apparatus according to the present invention. This radio communication apparatus comprises transmission power control apparatus 200 with control signal storage circuit 207 added to the transmission power control apparatus shown in FIG. 3, and transmission power control measuring circuit 206 that receives the correlator output, performs measurements for control of transmission power and sends the measurement result to control signal storage circuit 207 as a control signal.

In the radio communication apparatus configured as shown above, the reception power of a desired radio wave is calculated in reception power calculation circuit 201 using the correlator output and the result is stored in reception power storage circuit 202. If the apparatus has a configuration in which the reception system is provided with an AGC circuit, etc. and the level of the received signal is adjusted before correlation operations, reception power calculation circuit 201 calculates correct reception power using not only the correlator output but also the adjusted value above (AGC gain)

Furthermore, the correlator output is input to demodulation circuit 203 and the control signal is demodulated there. Here, transmission power control is also performed on the reverse line and if closed-loop control is applied, the correlator output is input to transmission power control measuring circuit 206 which in turn measures the reception power and SIR, etc. and outputs a control signal based on those result. In the present embodiment, the control signal is stored in control signal storage circuit 207. Transmission power calculation circuit 204 calculates the transmission power using past transmission power stored in transmission power storage circuit 205, the reception power of the desired radio wave stored in reception power storage circuit 202 and the control signal included in the received signal and the control signal included in the transmission signal, and outputs a transmission power set value.

Figure 5:
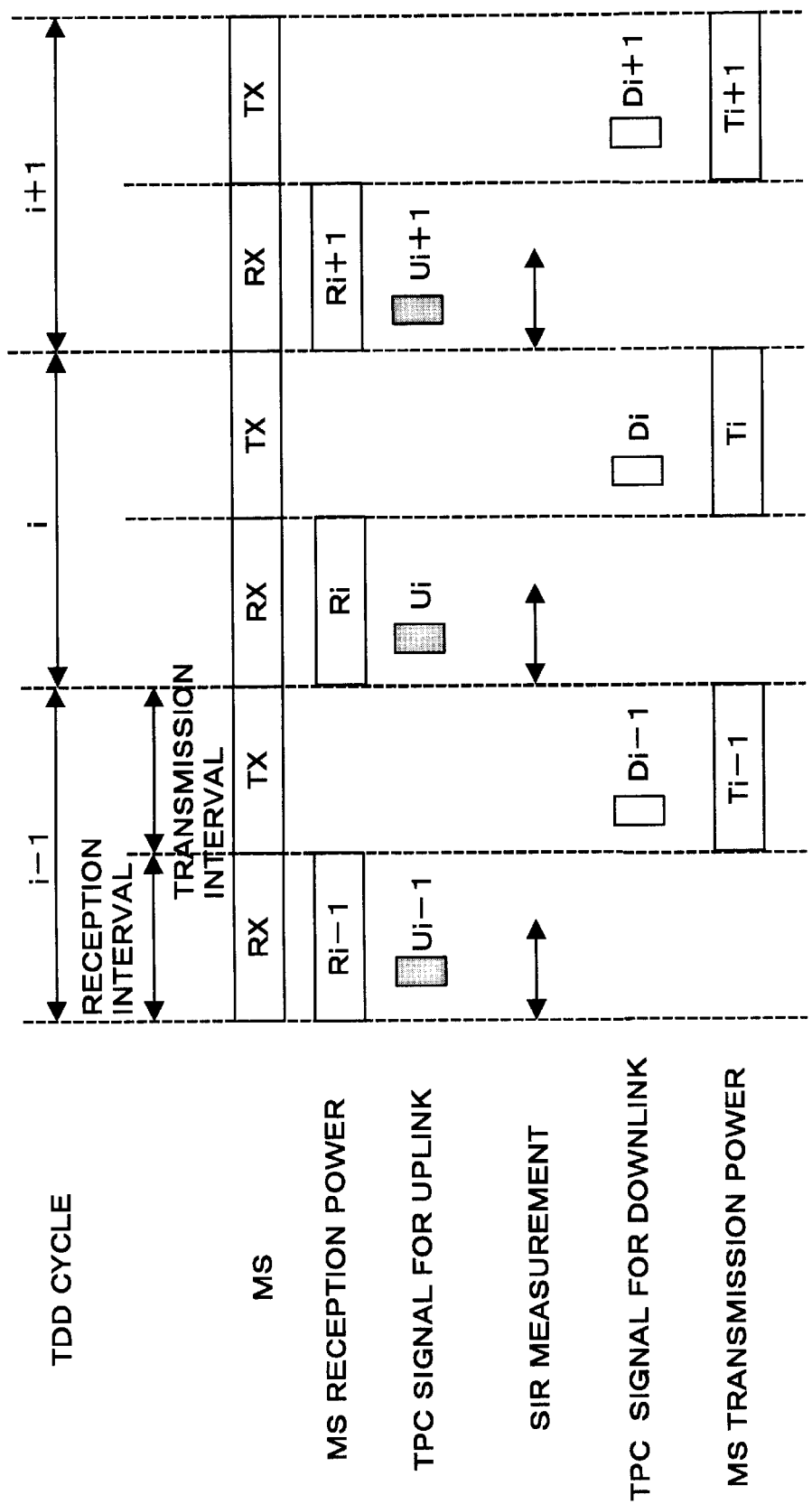
FIG. 5 is a timing chart showing an example of transmission/reception of a control signal and SIR measurement according to Embodiment 2 above.

FIG. 5 shows the transmission/reception intervals of the mobile station (MS) in a communication system which uses a TDD system as the communication system, its cycle (TDD cycle), MS reception power R on the downlink at that time, control signal included in the received signal U (TPC for the uplink), interval of SIR measurement carried out by the MS, control signal (TPC for the downlink) D determined and transmitted based on the result and an example of the timing of MS transmission power T.

From FIG. 5, it is understandable that transmission power control by closed-loop control with the same control cycle as for the uplink is applied to the downlink. A calculation example of transmission power Ti is shown in expression (5).

In FIG. 5, transmission power Ti of the MS in TDD cycle i is obtained from expression (5) based on transmission power Ti−1 in immediately preceding TDD cycle i−1, average reception power Ri−1, TPC signal Di−1 for the downlink, average reception power Ri in TDD cycle i received immediately before and TPC signal Ui for the uplink. Expression (5) makes it possible to store control signal Di−1 requested to the transmission power control apparatus of the counterpart in immediately preceding cycle i−1 and correct a variation of the transmission power of the counterpart caused by the instruction. In the example above, there is no delay after reception of the control signal until it is executed and the control signal is immediately executed in the next transmission interval.

$$T_i = T_{i-1} + (R_{i-1} - R_i) + U_i + D_{i-1} \quad (5)$$

As shown above, the present embodiment achieves high-precision transmission power control when transmission power control with the equivalent control speed is introduced on the reverse line, too.

Embodiment 3

Figure 6:
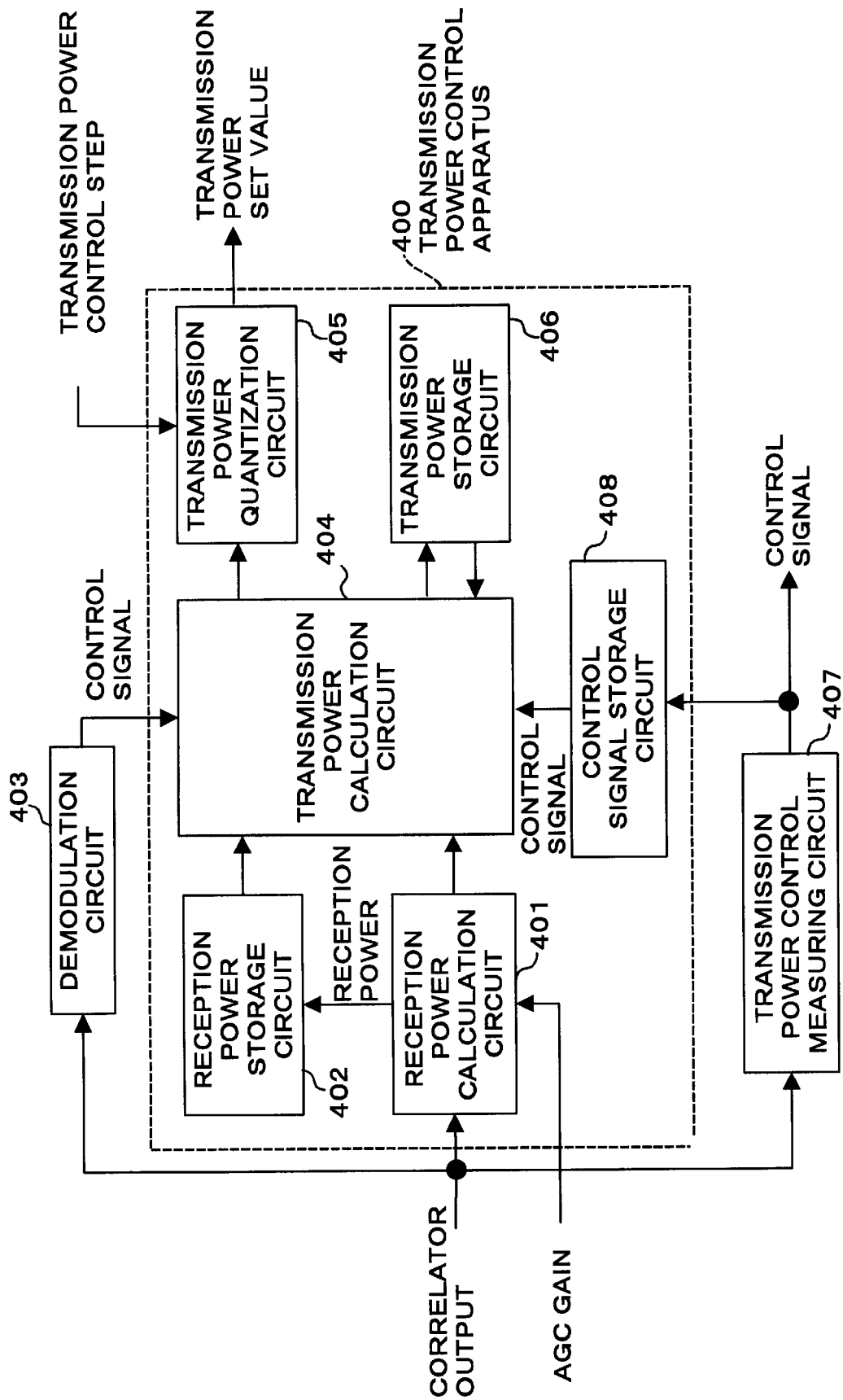
FIG. 6 is a block diagram showing the configuration of a radio communication apparatus according to Embodiment 3 of the present invention.

FIG. 6 is a block diagram showing the configuration of a radio communication apparatus equipped with a transmission power control apparatus according to the present invention. The radio communication apparatus shown in FIG. 6 comprises transmission power quantization circuit 405 which is added to the radio communication apparatus shown in FIG. 4 so that a transmission power set value is determined after carrying out quantization according to the transmission power control step of the radio section.

In the radio communication apparatus configured as shown above, the operation until transmission power is calculated by transmission power calculation circuit 404 of transmission power control apparatus 400 is the same as the operation of Embodiment 2. That is, the reception power of a desired radio wave is calculated in reception power calculation circuit 401 using the correlator output and the result is stored in reception power storage circuit 402. If the apparatus has a configuration in which the reception system is provided with an AGC circuit, etc. and the level of the received signal is adjusted before correlation operations, reception power calculation circuit 401 calculates correct reception power using not only the correlator output but also the adjusted value above (AGC gain).

Furthermore, the correlator output is input to demodulation circuit 403 and the control signal is demodulated there.

Here, transmission power control is also performed on the reverse line and if closed-loop control is applied, the correlator output is input to transmission power control measuring circuit 407 which in turn measures the reception power and SIR, etc. and outputs the control signal based on those results. The control signal is stored in control signal storage circuit 408.

Transmission power calculation circuit 404 calculates the transmission power using past transmission power stored in transmission power storage circuit 406, the reception power of the desired radio wave stored in reception power storage circuit 402 and the control signal included in the received signal and the control signal included in the transmission signal. The above calculation result is input to transmission power quantization circuit 404. In transmission power quantization circuit 405, a control step of the transmission power control section of the radio section is input and the transmission power is quantized into the control step to output a transmission power set value.

For example, in the transmission power calculation circuit that performs calculations based on expression (5), if the reception power stored in reception power storage circuit 402 is a 1 dB step and the control step of control signals Ui and Di−1 is set to an extremely small value of 0.25 dB, it is extremely difficult to control the radio section with a step width of 0.25 dB, and thus a high-precision attenuator with a small step width is required, which would make the hardware configuration complicated. In contrast to this, by setting the control step of the radio section to 1 dB and inputting it to transmission power quantization circuit 405, and quantizing the transmission power set values to values in 1-dB units and outputting them, it is possible not only to perform transmission power control with extremely small control steps of control signals Ui and Di−1 but also to simplify the configuration of the radio section.

Thus, even if a small control step is introduced for the calculation circuit of the transmission power control, the present embodiment allows the step width of the transmission power control section of the radio section to be set greater than said control step, eliminating the necessity of a high-precision attenuator with a small step width, thus simplifying the configuration of the radio section, which will facilitate the implementation.

Furthermore, by reducing the amount of control by a control signal included in the received signal in a same cycle period relative to a variation of the reception power of a desired radio wave during the control cycle, the embodiment above achieves high-precision control. For example, when variation |Ri−Ri−1| of the reception power of the desired radio wave during the control cycle is on the order of 5 dB, the amount of control by the control signal is set to 0.25 dB.

Through such a setting, control according to fading variations is performed through open-loop control from expression (4) or (5) and control whose change speed is slow compared with said fading variations such as SIR control or control difference correction is performed through closed-loop control. That is, different types of control are performed according to control items such as fading variations, SIR control or control difference correction. This can reduce influences of erroneous transmission power control due to a reception error of the control signal, allowing more precise control. Furthermore, high-precision control is realized by dividing control into different areas such as fading variation correction control through open-loop control, SIR control through closed-loop control and correction of control differences, etc.

Embodiment 4

Figure 7:
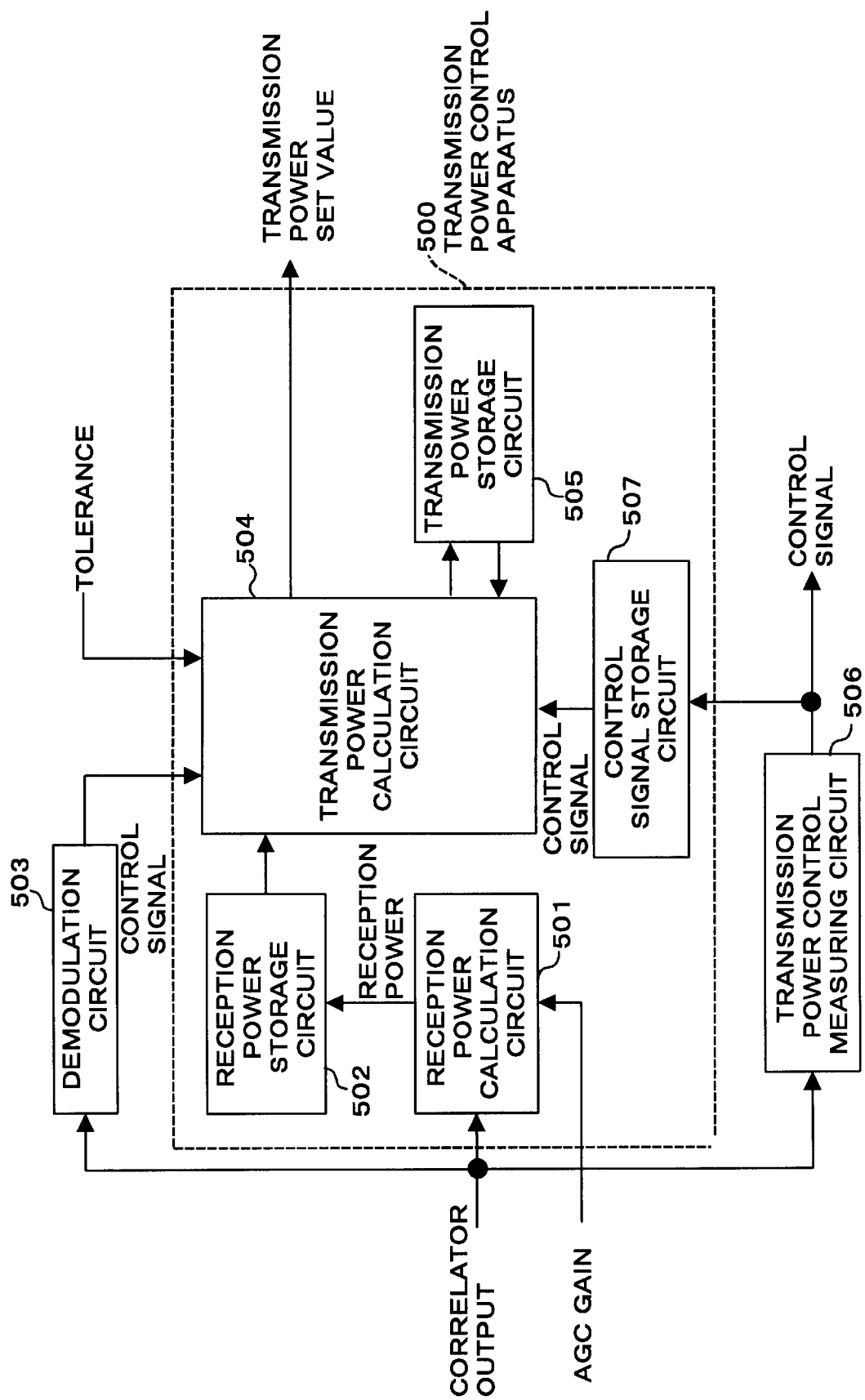
FIG. 7 is a block diagram showing the configuration of a radio communication apparatus according to Embodiment 4 of the present invention.

FIG. 7 is a block diagram showing the configuration of a radio communication apparatus equipped with a transmission power control apparatus according to the present invention. The radio communication apparatus shown in FIG. 7 is the transmission power control apparatus of the radio communication apparatus shown in FIG. 4 provided with a tolerance for the amount of variation of transmission power for every control cycle so that transmission control is performed only within the tolerance.

In the radio communication apparatus with this configuration, its operation until transmission power is calculated by transmission power calculation circuit 504 of transmission power control apparatus 500 is the same as that in Embodiment 2. That is, the reception power of a desired radio wave is calculated using the correlator output in reception power calculation circuit 501 and the result is stored in reception power storage circuit 502. If the apparatus has a configuration in which the reception system is provided with an AGC circuit, etc. and the level of the received signal is adjusted before correlation operations, reception power calculation circuit 501 calculates correct reception power using not only the correlator output but also the adjusted value above (AGC gain).

Furthermore, the correlator output is input to demodulation circuit 503 and the control signal is demodulated there. Here, transmission power control is also performed on the reverse line and if closed-loop control is applied, the correlator output is input to transmission power control measuring circuit 506 which in turn measures the reception power and SIR, etc. and outputs the control signal based on those results. The control signal is stored in control signal storage circuit 507.

Transmission power calculation circuit 504 calculates a transmission power set value using past transmission power stored in transmission power storage circuit 505, the reception power of the desired radio wave stored in reception power storage circuit 502 and the control signal included in the received signal and the control signal included in the transmission signal. At this time, a tolerance is input to transmission power calculation circuit 504 and the tolerance value (limit) is given to the amount of variation of the transmission power for every control cycle.

For example, when the absolute value (=variation) of the difference between transmission power Ti obtained from expression (5) and transmission power Ti−1 in the preceding cycle is 5 dB (|Ti−Ti−1|=5 dB, Ti>Ti−1), if the tolerance is 3 dB, the set value is output as Ti=Ti−1+3 dB. The value at that time is stored in transmission power circuit 505.

The tolerance value need not be the same in positive and negative. For example, strict restrictions can be set in a direction in which transmission power is increased which is likely to produce great interference with other stations.

Figure 8:
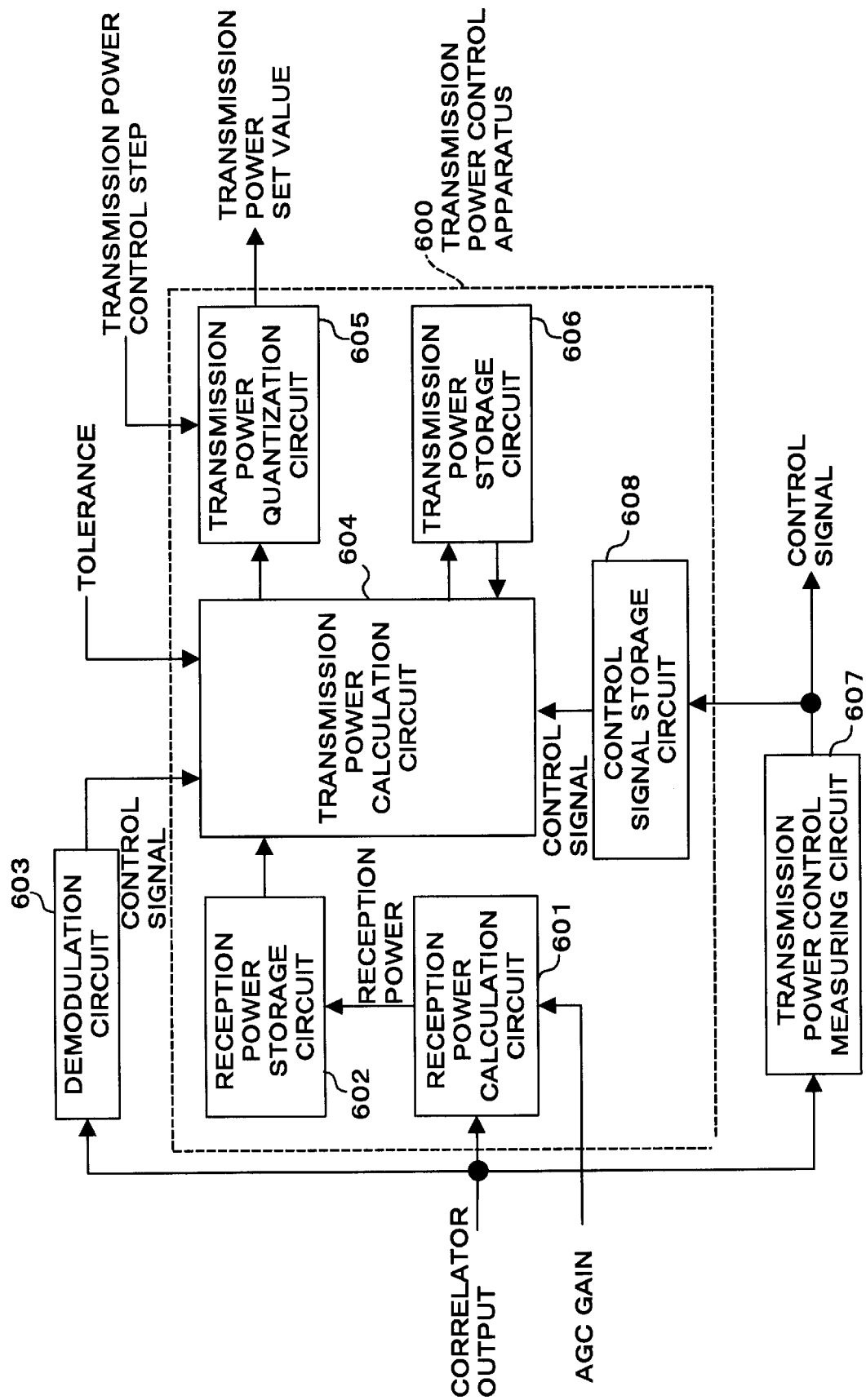
FIG. 8 is a block diagram showing another example of the configuration of the radio communication apparatus according to Embodiment 4 above.

Furthermore, the radio communication apparatus shown in FIG. 8 is the radio communication apparatus shown in FIG. 7 with the transmission power quantization circuit shown in Embodiment 3 added. In FIG. 8, the operation until transmission power is calculated by transmission power calculation circuit 604 of transmission power control apparatus 600 is the same as that in FIG. 7. A tolerance is input to transmission power calculation circuit 604 and a value with the amount of variation of transmission power restricted for every control cycle is output. In transmission power quantization circuit 605, a control step of the transmission power control section of the radio section is input and a transmission power set value is output with the above output quantized into control steps. In FIG. 8, 601 to 603 and 606 to 608 represent a reception power calculation circuit, reception power storage circuit, demodulation circuit, transmission power storage circuit, transmission power control measuring circuit and control signal storage circuit, respectively.

As shown above, if erroneous transmission power control is performed, the present embodiment is capable of reducing its influences. In the event of quick fading variations in particular, it can prevent excessive power from being transmitted due to erroneous open-loop control which would cause great interference with other stations.

Figure 9:
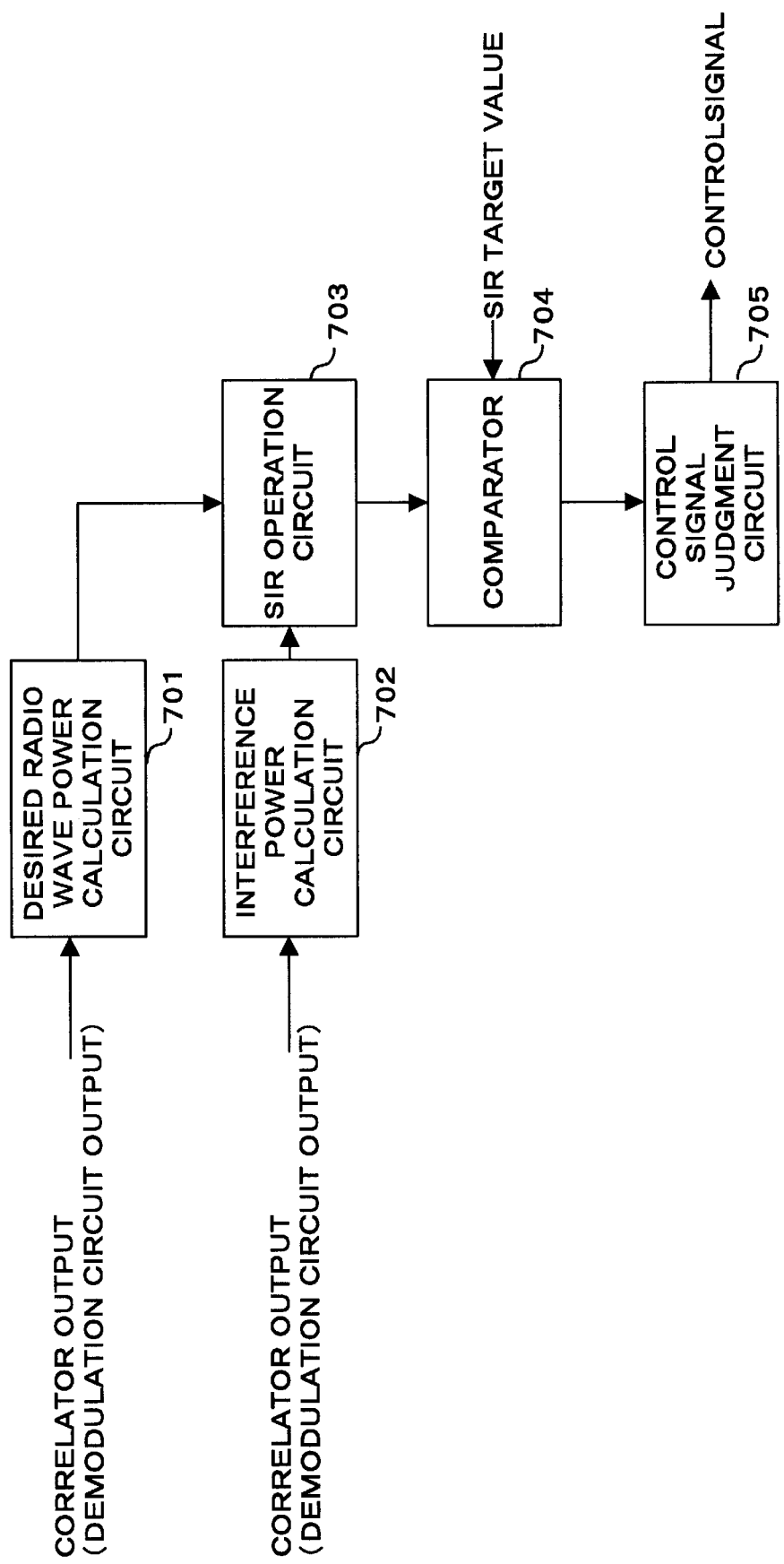
FIG. 9 is a block diagram showing the configuration of a transmission power control measuring apparatus included in the radio communication apparatuses according to Embodiments 2 to 4.

Here, the transmission power control measuring apparatus included in the radio communication apparatus in Embodiments 2 to 4 will be explained. FIG. 9 is a block diagram showing the configuration of the transmission power control measuring apparatus. The transmission power control measuring apparatus in this example calculates an SIR (Signal to Interference Ratio), detects a difference by comparison using the SIR as a target value and transmits a control signal based on this. That is, in desired radio wave power calculation circuit 701, the desired radio wave reception power is calculated cyclically using the correlator output or demodulation circuit output. The interference power is also calculated cyclically using the correlator output or demodulation circuit output in interference power calculation circuit 702.

Here, the cycles for obtaining the desired radio wave and interference need not match. Furthermore, when calculating the SIR the desired radio wave power and interference power need not always be obtained from the correlator output, but can also be calculated using the power after RAKE combining. Based on the above two reception powers, the SIR obtained in SIR operation circuit 703 is compared with an SIR target value in comparator 704. Based on the calculated control difference, control signal judgment circuit 705 determines and outputs the control signal.

Figure 10:
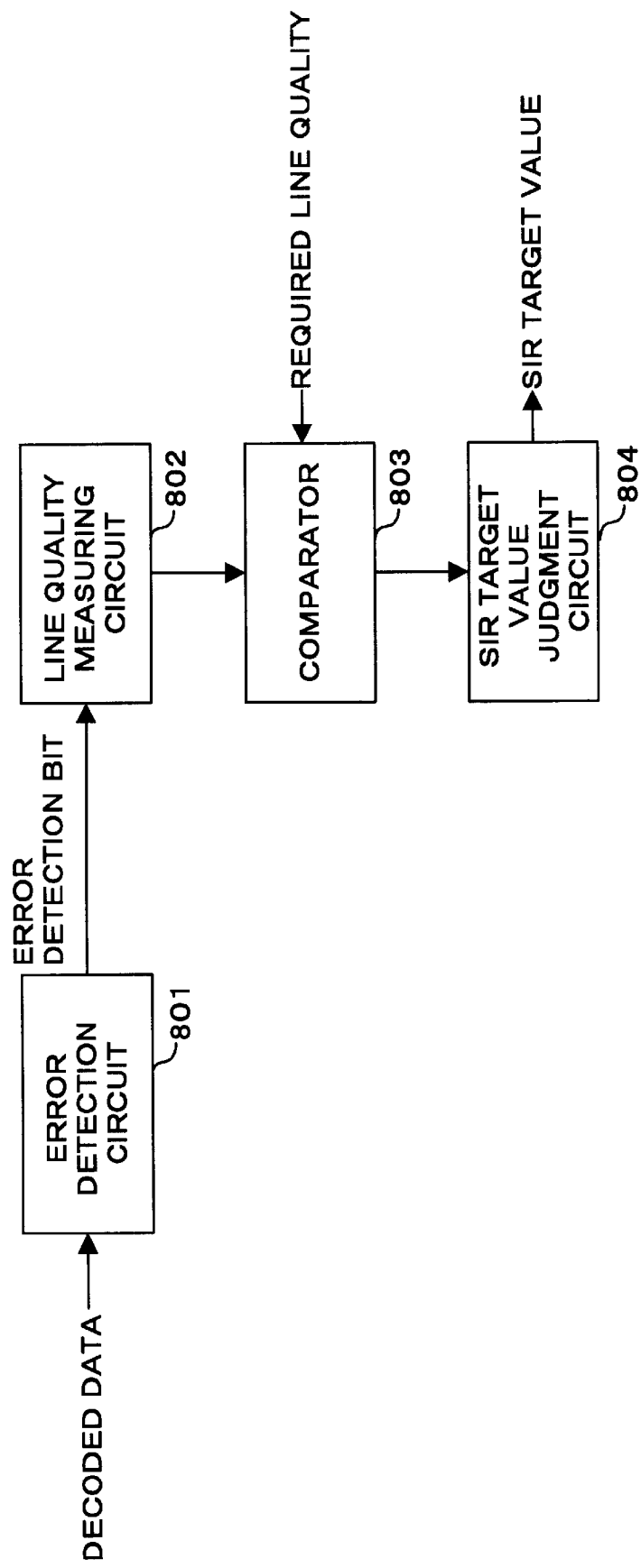
FIG. 10 is a block diagram showing the configuration of a correction circuit of the transmission power control measuring apparatus according to Embodiments 2 to 4.

FIG. 10 is a block diagram showing the configuration of a correction circuit which will be added to the transmission power control measuring apparatus shown in FIG. 9, which detects a difference from a target value of the line quality and changes target values such as the reception power and SIR based on the result. In FIG. 10, using decoded data (which matches the decoded data in FIG. 11) as an input, error detection is performed in error detection circuit 801 and an error detection bit is output. Based on the line quality such as a frame error rate measured in line quality measuring circuit 802, a comparison is made with the required line quality in comparator 803, and SIR target value judgment circuit 804 judges whether the currently set SIR target value is appropriate or not and a new target value for updating is calculated and output.

As shown above, even if the target values such as the originally set reception power and SIR may result in a communication quality inferior or excessive due to variations in the operating environment of the transmission system, the radio communication apparatus equipped with a transmission power control measuring apparatus can adaptively change the target values above, always providing a stable line quality.

The radio communication apparatus explained in Embodiments 2 to 4 above and the transmission power control apparatus explained in Embodiment 1 can be applied to both mobile station apparatus and base station apparatus in a radio communication system.

Embodiment 5

In the present embodiment, a CDMA radio communication system comprising a radio communication apparatus equipped with the transmission power control apparatus of Embodiment 1 and a radio communication apparatus equipped with the transmission power control measuring apparatus of Embodiment 4 is explained.

Figure 11:
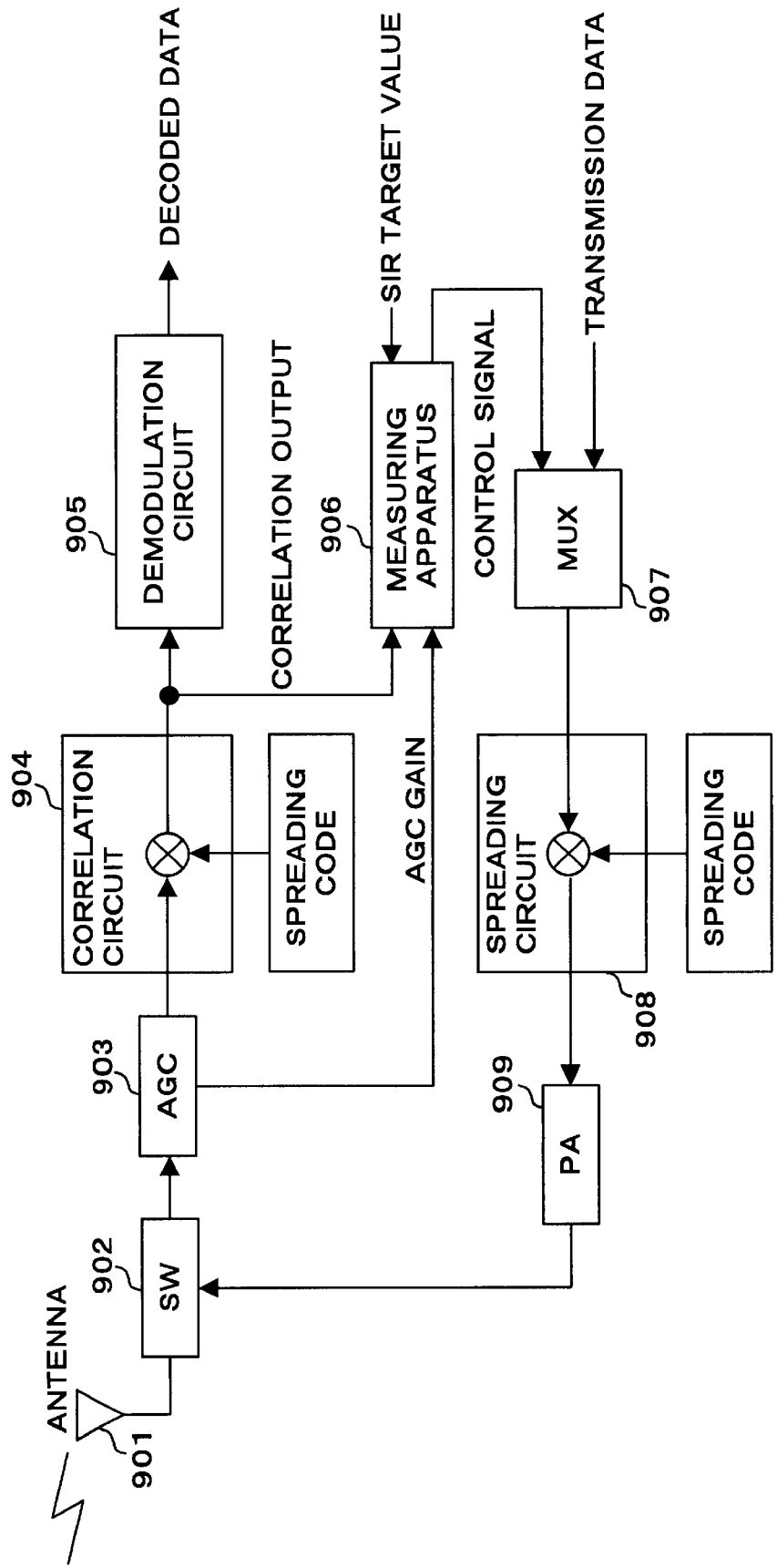
FIG. 11 is a block diagram showing the configuration of a radio communication apparatus used for a radio communication system according to Embodiment 5 of the present invention.

FIG. 11 is a block diagram showing the configuration of the radio communication apparatus (base station) equipped with the transmission power control measuring apparatus shown in FIG. 9. This radio communication apparatus comprises antenna 901 that performs signal transmission/reception, switch (SW) or duplexer 902 that switches transmission/reception, AGC circuit 903 that adjusts the level of a received signal before correlation operations, correlation circuit 904 that performs correlation operations of the received signal, demodulation circuit 905 that demodulates the received signal, measuring apparatus 906 that measures the reception level from the correlation output, AGC gain and SIR target value and generates a control signal, MUX 907 that performs data frame configuration, 908 that performs spreading processing on the transmission data, and PA circuit 909 that amplifies the transmission signal.

Figure 12:
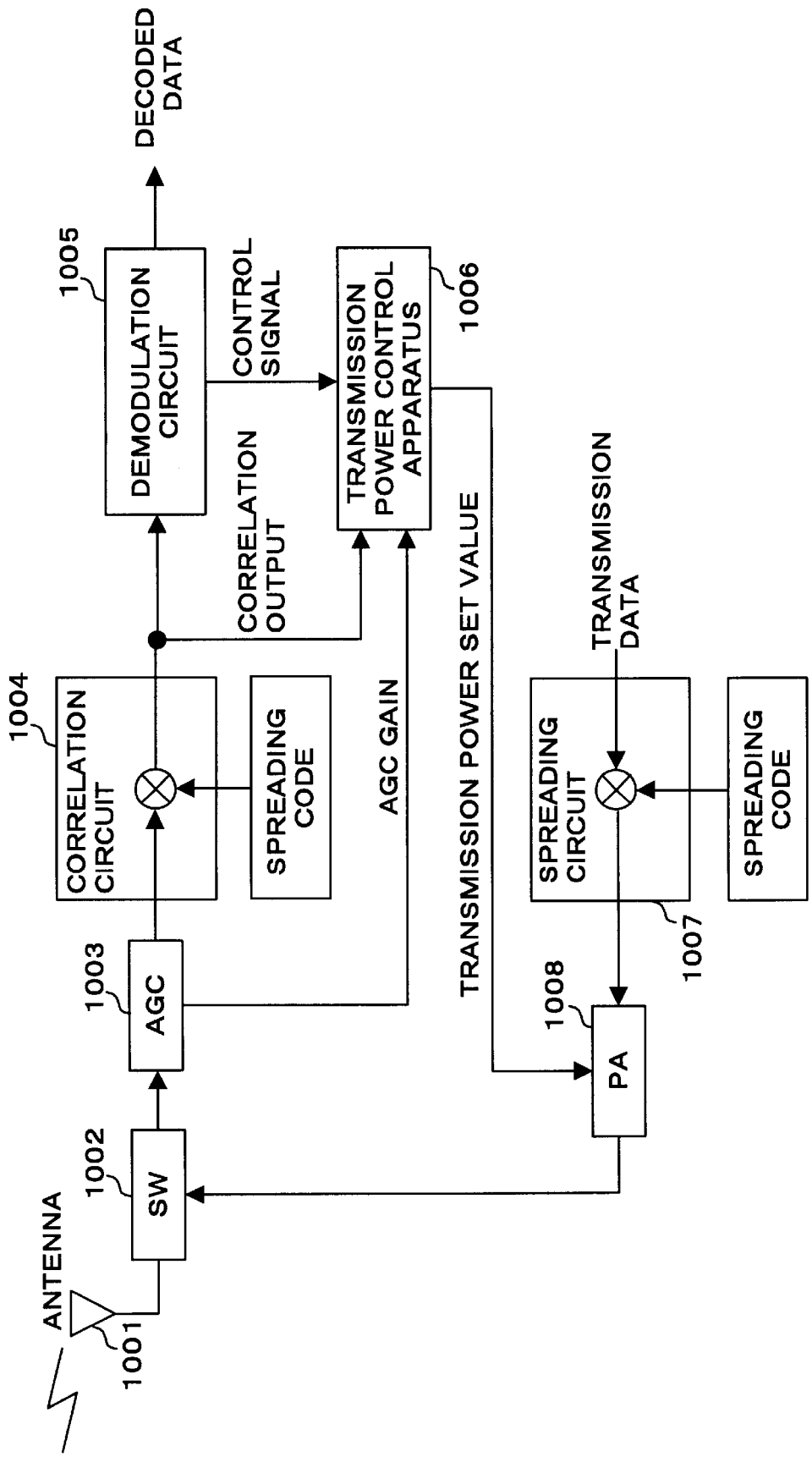
FIG. 12 is a block diagram showing the configuration of the radio communication apparatus used for the radio communication system according to Embodiment 5 above.

FIG. 12 is a block diagram showing the configuration of the radio communication apparatus (mobile station) equipped with the transmission power control apparatus of Embodiment 1. This radio communication apparatus comprises antenna 1001 that performs signal transmission/reception, switch (SW) 1002 that switches transmission/reception, AGC circuit 1003 that adjusts the level of a received signal before correlation operations, correlation circuit 1004 that performs correlation operations of the received signal, demodulation circuit 1005 that demodulates the received signal, transmission power control apparatus 1006 that performs transmission power control from the correlation output, AGC gain and transmitted control signal and measures the reception level from the AGC gain and generates the control signal, 1007 that performs spreading processing on the transmission data, and PA circuit 1008 that amplifies the transmission signal.

In the radio communication system configured as shown above, on the base station side, the received signal from antenna 901 is input to AGC circuit 903 passing through switch or duplexer 902, with its level adjusted so that the received signal may keep its level constant and output to correlation circuit 904. The gain adjusted by AGC circuit 903 is output as an AGC gain.

The correlation output obtained by correlation operations using a spreading code in correlation circuit 904 is subjected to demodulation processing including detection and error corrections in demodulation circuit 905, then output as demodulated data. Transmission power control measuring apparatus 906 calculates SIR from the correlation output and AGC gain and outputs a control signal obtained from the processing shown in FIG. 9 using a target value. The control signal is subjected to frame assembly processing together with the transmission data in MUX circuit 907, then spreading processing in spreading circuit 908 using a spreading code and transmitted from antenna 901 after passing through PA circuit 909.

On the other hand, on the mobile station side, the received signal from antenna 1001 passes through switch 1002, enters AGC circuit 1003 where it is adjusted to a certain level and is output to correlation circuit 1004. The gain adjusted in AGC circuit 1003 is output as an AGC gain.

The correlation output obtained by correlation operation with the spreading code in correlation circuit 1004 is subjected to demodulation processing including detection and error corrections in demodulation circuit 1005, then output as demodulated data. At this time, the control signal is output.

Transmission power control apparatus 1006 calculates the reception power using the correlation output and AGC gain, and outputs the transmission power set value obtained from the processing in Embodiment 1 to the PA circuit. The transmission data is spread with the spreading code in spreading circuit 1007 and transmitted from antenna 1001 with a value of power set by PA circuit 1008.

Figure 13:
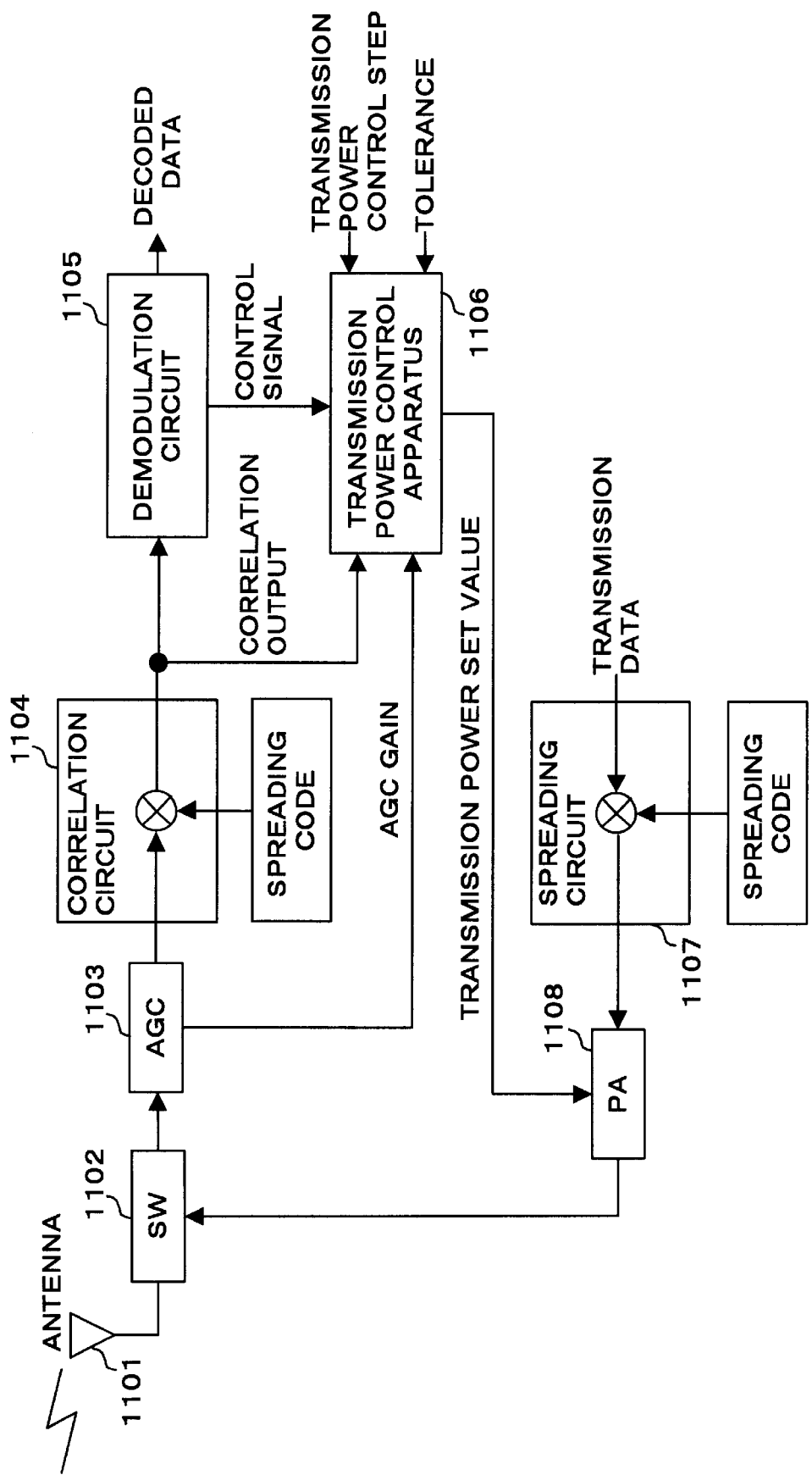
FIG. 13 is a block diagram showing the configuration of another example of the radio communication apparatus used for the radio communication system according to Embodiment 5 above.

At this time, the transmission power control apparatus can also be designed to perform quantization through the transmission power control step explained in Embodiments 3 and 4 or provided with restrictions on the width of variation with a tolerance. That is, as shown in FIG. 13, the system can also be configured so that a transmission power control step or tolerance is input to the transmission power control apparatus. In FIG. 13, the operation of transmission power control apparatus 1106 is the same as the operation in Embodiments 3 and 4, and the operations of all other components, antenna 1101, switch 1102, AGC circuit 1103, correlation circuit 1104, demodulation circuit 1105, spreading circuit 1107 and PA circuit 1108 are the same as those of the radio communication apparatus shown in FIG. 12.

Thus, according to the present embodiment, one radio communication apparatus (mobile station) in the CDMA radio communication system can perform dynamic transmission power control which is a feature of open-loop control using a periodically received control signal and the reception power of a desired radio wave without requiring the information of the other communication apparatus (base station). Furthermore, this system can also eliminate the necessity of storage of the cumulative value of control signals during corrections through closed-loop control.

Embodiment 6

The present embodiment describes a CDMA radio communication system comprising a transmission power control apparatus that determines a transmission power set value using a control signal included in a received signal, a radio communication apparatus equipped with the transmission power control measuring apparatus shown in FIG. 9, the transmission power control apparatus shown in FIG. 8 and a radio communication apparatus equipped with the transmission power control measuring apparatus shown in FIG. 9.

Figure 14:
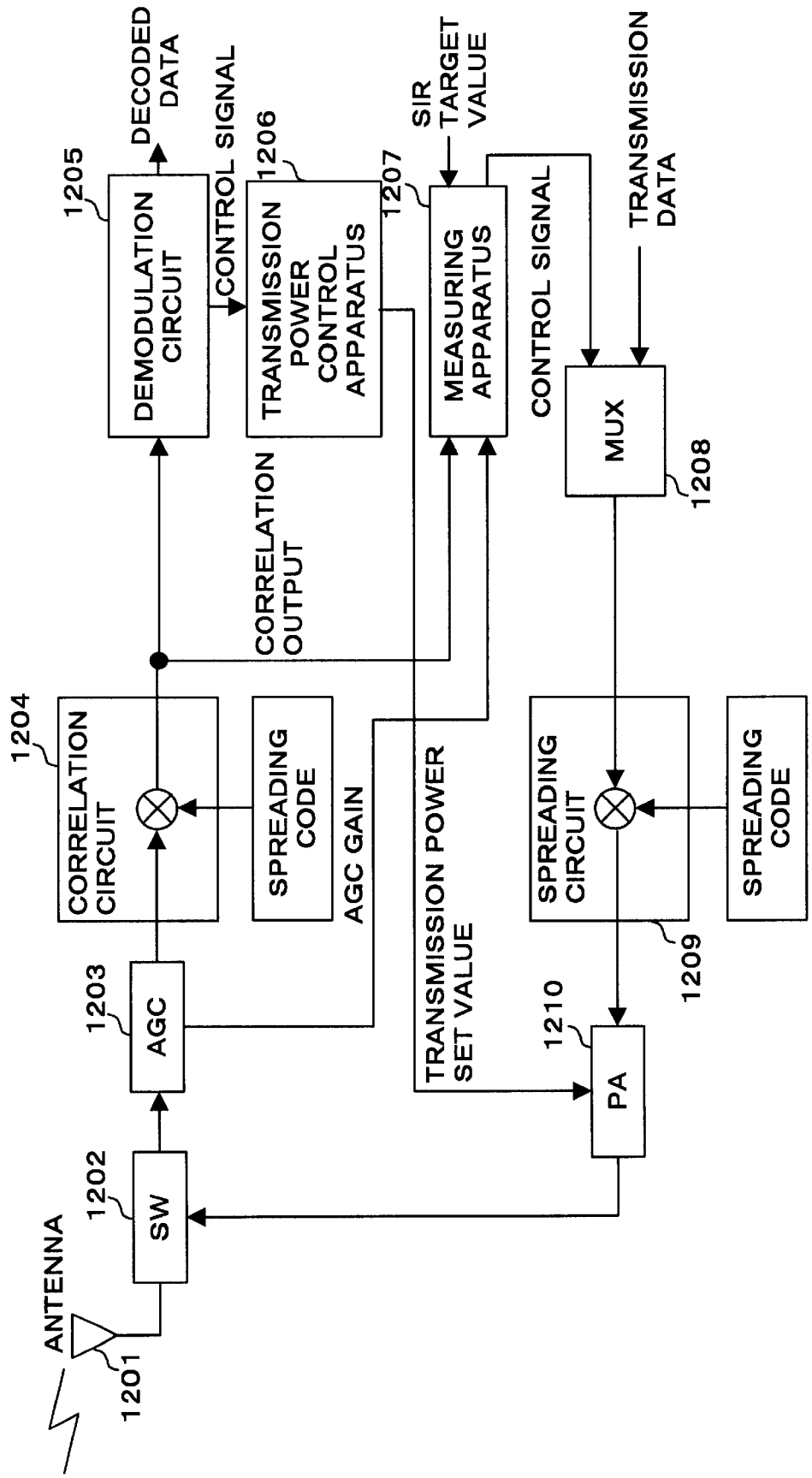
FIG. 14 is a block diagram showing the configuration of a radio communication apparatus used for a radio communication system according to Embodiment 6 of the present invention.

FIG. 14 is a block diagram showing the configuration of a radio communication apparatus (base station) equipped with the transmission power control measuring apparatus shown in FIG. 9. This radio communication apparatus comprises antenna 1201 that performs signal transmission/reception, switch (SW) or duplexer 1202 that switches transmission/reception, AGC circuit 1203 that adjusts the level of a received signal before correlation operations, correlation circuit 1204 that performs correlation operations of the received signal, demodulation circuit 1205 that demodulates the received signal, transmission power control apparatus 1206 that controls the transmission power according to a control signal from the transmission data and outputs a transmission power set value, measuring apparatus 1207 that measures the reception level from the correlation output, AGC gain and SIR target value and generates a control signal, MUX 1208 that performs data frame configuration, 1209 that performs spreading processing on the transmission data, and PA circuit 1210 that amplifies the transmission signal based on the transmission power set value from transmission power control apparatus 1206.

Figure 15:
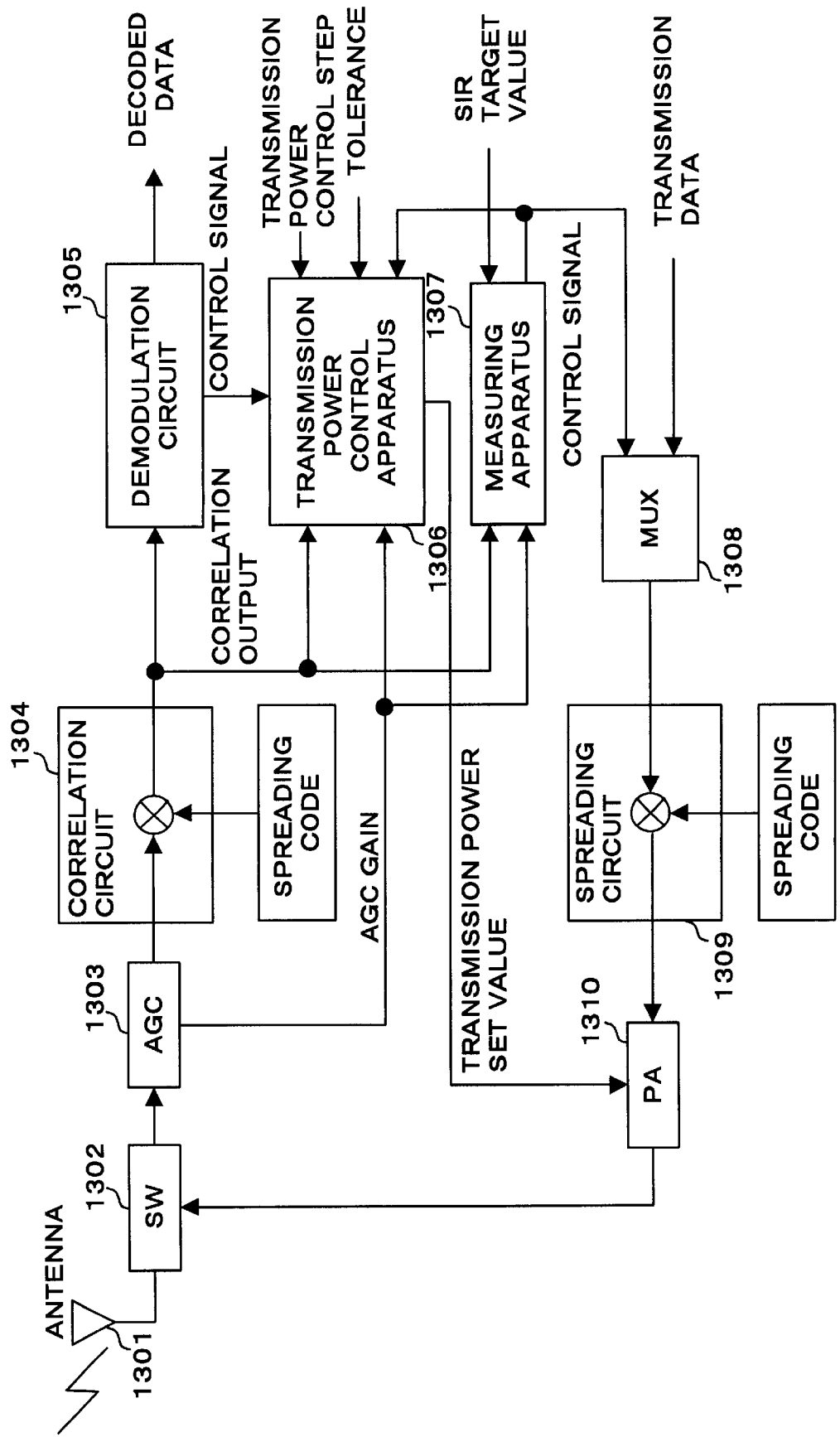
FIG. 15 is a block diagram showing the configuration of the radio communication apparatus used for the radio communication system according to Embodiment 6 above.

FIG. 15 is a block diagram showing the configuration of a radio communication apparatus (mobile station) equipped with the transmission power control measuring apparatus shown in FIG. 9. This radio communication apparatus comprises antenna 1301 that performs signal transmission/reception, switch (SW) 1302 that switches transmission/reception, AGC circuit 1303 that adjusts the level of a received signal before correlation operations, correlation circuit 1304 that performs correlation operations of the received signal, demodulation circuit 1305 that demodulates the received signal, transmission power control apparatus 1306 that controls the transmission power according to the correlation output, AGC gain and transmitted control signal and generates the control signal, measuring apparatus 1307 that measures the reception level according to the correlation output, AGC gain and SIR target value, MUX 1308 that performs data frame configuration, 1309 that performs spreading processing on the transmission data, and PA circuit 1310 that amplifies the transmission signal based on the transmission power set value from transmission power control apparatus 1306.

In the radio communication system configured as shown above, on the base station side, the received signal from antenna 1201 passes through switch 1202 and enters AGC circuit 1203 where it is adjusted to a certain level, and is output to correlation circuit 1204. The gain adjusted in AGC circuit 1203 is output as an AGC gain. The correlation output subjected to correlation operations with a spreading code in correlation circuit 1204 is subjected to demodulation processing including detection and error corrections in demodulation circuit 1205, then output as demodulated data. At this time, a control signal is output.

In transmission power control apparatus 1206, a transmission power set value is calculated using the control signal through closed-loop control shown in expression (2) and the result is output to PA circuit 1210. On the other hand, transmission power control measuring apparatus 1207 calculates an SIR from the correlation output and AGC gain and outputs a control signal obtained using the SIR target value through the processing shown in FIG. 9 above.

The transmission data, after undergoing frame assembly processing in MUX circuit 1208 together with the control signal above, is spread with a spreading code in spreading circuit 1209, amplified to a set level of power in PA circuit 1210 and transmitted from antenna 1201.

On the other hand, on the mobile station side, the received signal from antenna 1301 passes through switch 1302 and enters AGC circuit 1303 where it is adjusted to a certain level and output to correlation circuit 1304. The gain adjusted in AGC circuit 1303 is output as an AGC gain. The correlation output subjected to correlation operations with a spreading code in correlation circuit 1304 is subjected to demodulation processing including detection and error corrections in demodulation circuit 1305, then demodulated data are output. At this time, a control signal is output.

Transmission power control apparatus 1306 calculates the reception power using the correlation output and AGC gain. On the other hand, transmission power control measuring apparatus 1307 calculates an SIR from the correlation output and AGC gain and outputs a control signal obtained using the target value through the processing shown in FIG. 9 above.

Transmission power control apparatus 1306 calculates a transmission power set value using the reception power above, transmission power control step, tolerance and two control signals through the processing shown in FIG. 8 and outputs it to PA circuit 1310. The transmission data, after undergoing frame assembly processing in MUX circuit 1308 together with the control signal, is spread with a spreading code in spreading circuit 1309 and transmitted from antenna 1301 with a value of power set in PA circuit 1310.

Thus, according to the present embodiment, one communication apparatus can perform dynamic transmission power control which is a feature of open-loop control without requiring the information of the other communication apparatus such as transmission power and desired reception level, and it can also eliminate the necessity of storage of the cumulative value of control signals during corrections through closed-loop control. The other communication apparatus can also perform transmission power control at a control speed equivalent to that of the aforementioned communication apparatus.

The embodiment above explains the case where a specific configuration is applied to the mobile station apparatus and base station apparatus. However, the present invention can also be implemented by selecting any appropriate configuration of the embodiment above and applying it to the mobile station apparatus or base station apparatus.

As shown above, the transmission power control apparatuses and radio communication apparatuses of the present invention can perform dynamic transmission power control which is a feature of open-loop control without requiring information of the communication counterpart such as transmission power and desired reception level. Furthermore, these apparatuses can also eliminate the necessity of storage of the cumulative value of control signals during corrections using also closed-loop control. For the reverse line, they can also implement transmission power control with an equivalent control speed.

This application is based on the Japanese Patent Application No. HEI 10-44429 filed on Feb. 10, 1998, of which entire content is expressly incorporated by reference herein.

What is claimed is:

1. A combined open-loop and closed-loop transmission power control apparatus that controls transmission power based on a received level of a received signal from a communication partner, the apparatus comprising:
   a reception power storage system that stores a reception power obtained from the received signal;
   a transmission power storage system that stores a past transmission power; and
   a transmission power set value determination system that determines a transmission power set value based on a control signal included in the received signal, the past transmission power and the reception power.

2. The transmission power control apparatus according to claim 1, further comprising a power quantization system that quantizes the transmission power set value according to the width of a transmission power control step.

3. The transmission power control apparatus according to claim 1, wherein an amount of control by the control signal is reduced relative to a variation of the reception power.

4. The transmission power control apparatus according to claim 1, wherein a tolerance is set for a variation of the transmission power.

5. The transmission power control apparatus according to claim 1, wherein the transmission power set value determination system determines the transmission power set value using a control signal transmitted for control of the transmission power on a reverse line.

6. A mobile station apparatus, comprising the transmission power control apparatus according to claim 1.

7. A base station apparatus, comprising the transmission power control apparatus according to claim 1.

8. A radio communication system, comprising:
a first radio communication apparatus comprising the transmission power control apparatus according to claim 1; and
a second radio communication apparatus comprising a transmission power control measuring apparatus that measures at least one of the reception power and an SIR from the received signal and that transmits a control signal based on the transmission power control measurement.

9. The radio communication system according to claim 8, wherein the transmission power control measuring apparatus comprises:
a line quality measuring system that measures a line quality from a demodulation result of the received signal; and
a change system that changes a target value based on the measurement of the line quality, the target value comprising at least one of the reception power and the SIR.

10. A radio communication system, comprising:
a first radio communication apparatus comprising the transmission power control apparatus according to claim 1 and a transmission power control measuring system that measures at least one of the reception power and an SIR from the received signal and that transmits a control signal based on the measurement; and
a second radio communication apparatus comprising a second transmission power control apparatus that determines a transmission power set value using a control signal included in the received signal and a second transmission power control measuring system that measures at least one of the reception power and the SIR from the received signal and that transmits a control signal based on the measurement.

11. The radio communication system according to claim 10, wherein each of the transmission power control measuring apparatuses of the first and second radio communication apparatuses comprises a line quality measuring system that measures a line quality from the demodulation results of the received signal and a change system that changes a target value based on the measurement of the line quality, the target value comprising at least one of the reception power and the SIR.

12. A combined open-loop and closed-loop transmission power control method, comprising:
storing a reception power of a obtained from a received signal;
storing a past transmission power; and
determining a transmission power set value from a control signal included in the received signal, the past transmission power and the reception power of the received signal.

13. The transmission power control method according to claim 12, further comprising quantizing the set value of the transmission power according to a width of a transmission power control step.

14. The transmission power control method according to claim 12, further comprising reducing an amount of control by the control signal relative to a variation of the reception power of the received signal.

15. The transmission power control method according to claim 12, further comprising setting a tolerance for a variation of the transmission power.

16. A radio communication method, comprising implementing, by a first radio communication apparatus, the transmission power control method according to claim 12; and
measuring, by a second radio communication apparatus, at least one of the reception power and an SIR from the received signal and transmitting a control signal based on the measurement result.

17. The radio communication method according to claim 16, wherein the transmitting of the control signal comprises:
measuring a line quality for a demodulation result of the received signal; and
changing a target value based on the line quality measurement result, the target value comprising at least one of the reception power and the SIR.

18. A radio communication method, comprising implementing, by a first radio communication apparatus, the transmission power control method according to claim 12 to measure at least one of the reception power and an SIR from the received signal and sending a control signal based on the measurement result; and
determining, by a second radio communication apparatus, a transmission power set value using a control signal included in the received signal, measuring at least one of the reception power and an SIR from the received signal, and sending a control signal based on the measurement result.

19. The radio communication method according to claim 18, wherein the transmitting of the control signal in each of the first and second radio communication apparatuses comprises measuring a line quality from a demodulation result of the received signal and changing a target value based on the line quality measurement result, the target value comprising at least one of the reception power and the SIR.

* * * * *